United States Patent [19]
Staats

[11] Patent Number: 5,968,152
[45] Date of Patent: Oct. 19, 1999

[54] METHOD AND APPARATUS FOR EXTENDING KEY SPACE IN A PLUG AND PLAY ROM

[75] Inventor: Erik P. Staats, Brookdale, Calif.

[73] Assignee: Apple Computer, Inc., Cupertino, Calif.

[21] Appl. No.: 08/833,337

[22] Filed: Apr. 4, 1997

Related U.S. Application Data

[60] Provisional application No. 60/015,125, Apr. 10, 1996.

[51] Int. Cl.[6] .......................... G06F 17/30; G06F 15/177
[52] U.S. Cl. ............................. 710/104; 707/200; 713/1
[58] Field of Search ...................... 395/284, 828, 395/800.27, 200.5, 651; 707/101, 200, 100, 102–104; 710/104, 8, 11; 713/1, 100

[56] References Cited

U.S. PATENT DOCUMENTS

| | | | |
|---|---|---|---|
| 4,730,212 | 3/1988 | Wojcik et al. .............................. | 348/61 |
| 4,945,475 | 7/1990 | Bruffey et al. .............................. | 707/1 |
| 5,247,683 | 9/1993 | Holmes et al. ..................... | 395/200.51 |
| 5,313,646 | 5/1994 | Hendricks et al. ...................... | 707/101 |
| 5,353,411 | 10/1994 | Nakaosa et al. ......................... | 395/651 |
| 5,491,817 | 2/1996 | Gopal et al. ............................. | 707/200 |
| 5,664,170 | 9/1997 | Taylor ................................... | 395/200.5 |
| 5,734,922 | 3/1998 | Hagersten et al. .................. | 395/800.37 |
| 5,748,980 | 5/1998 | Lipe et al. .............................. | 395/828 |
| 5,752,243 | 5/1998 | Reiter et al. ............................... | 707/3 |

OTHER PUBLICATIONS

*Standard for A High Performance Serial Bus*, IEEE Standards Document 1394, Draft 8.0v3, Oct. 16, 1995.

*Information Technology—Microprocessor Systems—Control and Status Registers (CSR) Architecture for Microcomputer Buses*, IEEE Standards Document 1212, 1994 edition.

*Primary Examiner*—Gopal C. Ray
*Attorney, Agent, or Firm*—Blakely, Sokoloff, Taylor & Zafman

[57] ABSTRACT

A computer system comprises a plurality of nodes interconnected by point-to-point links and forms a serial bus. At least one of the plurality of nodes includes an associated configuration memory storing configuration information. The configuration memory is arranged into a plurality of directories according to an hierarchical structure. At least one of directories has a key value which indicates a unique directory entry within the configuration memory, the unique directory entry comprising an extended key value. In one embodiment, the extended key value indicates a driver directory. In a second embodiment, the extended key indicates a protocol directory.

15 Claims, 9 Drawing Sheets

METHOD AND APPARATUS FOR EXTENDING KEY SPACE IN A PLUG AND PLAY ROM

This application claims benefit of provisional application Ser. No. 60/015,125, filed Apr. 10, 1996.

FIELD OF THE INVENTION

This invention relates generally to computer systems and, more particularly, to providing interoperability between computer system components.

BACKGROUND

Computer systems are comprised of a variety of different components or "devices" that operate together to form the resultant system. Typically, some of the devices are supplied with the computer system initially, such as the central processing unit, and some devices can be installed into the computer system after the initial configuration of the system. The devices of the computer system are generally coupled together via interconnects (or busses) which may be of several types. Common interconnects include SCSI, ADB and serial connections such as that described by IEEE Standards Document 1394, entitled *Standard For A High Performance Serial Bus* (hereinafter the "IEEE 1394 Serial Bus Standard").

In general, a computer interconnect is comprised of a multiplicity of nodes that are interconnected via point-to-point links, such as cables. The nodes themselves are uniquely addressable entities which can be independently reset and identified. Nodes are associated with respective components of the computer system and serve as interfaces between the components and the communications links.

The variety of computer interconnects has led to the development of a common scalable bus-technology-independent Control and Status Register (CSR) Architecture which attempts to minimize the software and firmware changes necessary when migrating a processor from one system bus to another or when bridging from one bus to another. This common CSR Architecture is described in IEEE Standards Document 1212, 1994 edition, entitled *Information Technology—Microprocessor Systems—Control and Status Registers (CSR) Architecture for Microcomputer Buses* (hereinafter the "CSR Architecture").

Figure 1:
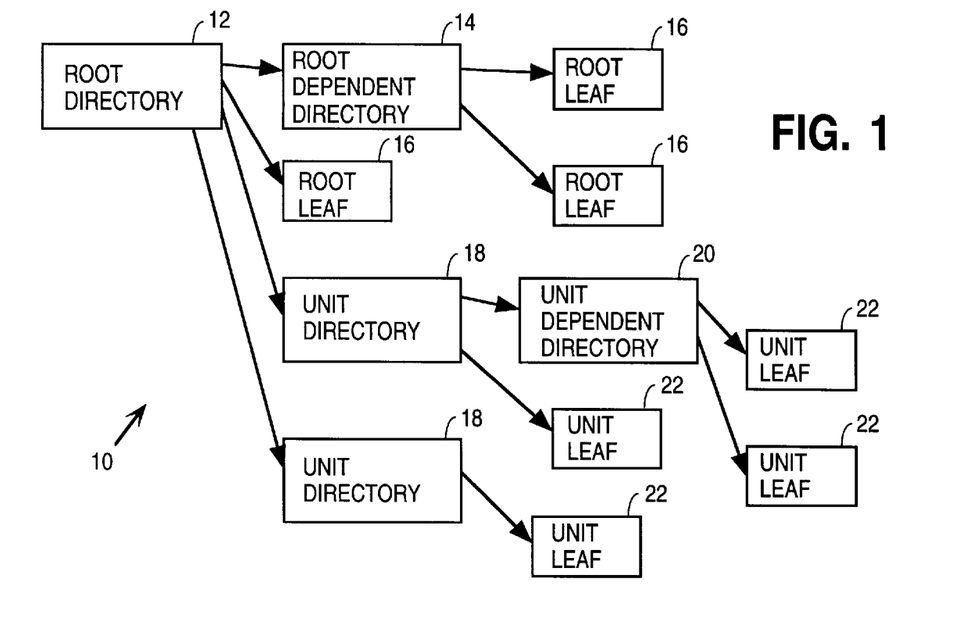
FIG. 1 illustrates the general hierarchy of a node configuration ROM according to the CSR Architecture.

The CSR Architecture describes a hierarchical configuration ROM directory structure. FIG. 1 illustrates the general ROM format for a configuration ROM 10 according to the CSR Architecture. In general, node configuration ROMs 10 reside within the address space of the computer interconnect. As shown, the configuration ROM 10 is divided into a root directory 12, various root dependent directories 14, root leafs 16, unit directories 18, unit dependent directories 20, and unit leafs 22. Thus, the directories are arranged in a hierarchical fashion. Within this structure, directories may have "children", "parents" and "siblings".

Entries within the root directory 12 may provide information or may provide a pointer to another directory (e.g., a root dependent directory 14) which has the same structure as the root directory, or to a root leaf 16 which contains information. The unit directories 18 contain information about each unit, such as its software version number and its location within the node's address space.

Figure 2:
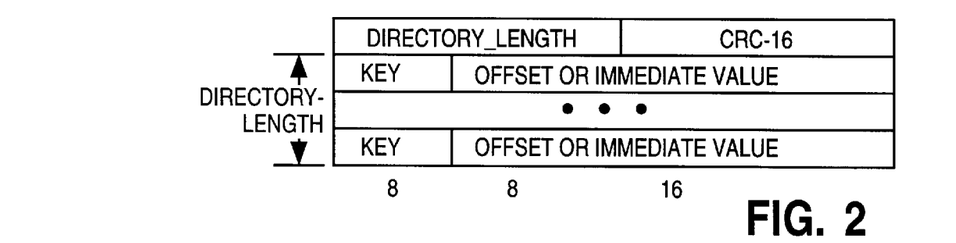
FIG. 2 illustrates the format of a typical directory within a node configuration ROM according to the CSR Architecture.

All directories in the node configuration ROMs 10 have the format shown in FIG. 2. The directory length parameter specifies the number of following quadlet entries in the directory. Each directory entry then has the format shown in FIG. 3. Each directory entry is broken down into a key field and an entry value field. The key field itself has two fields: the key type, indicating the type of directory entry, and the key value, specifying the particular directory entry, e.g., spec_ID, unit software version, etc. The key type definitions for an embodiment according to the IEEE 1394 Serial Bus Standard are shown in Table 1, below.

TABLE 1

Figure 3:
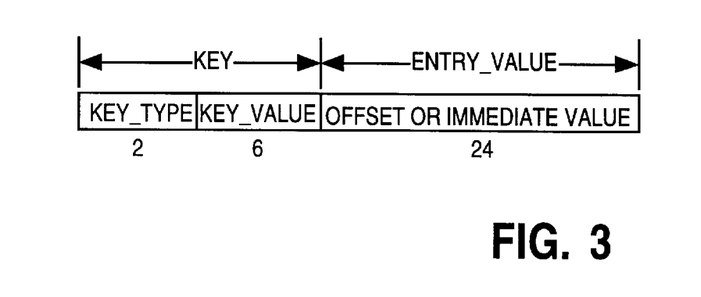
FIG. 3 illustrates the format of a directory entry in a node configuration ROM according to the CSR Architecture.

| Reference Name | Key Type | Meaning of Least Significant 24-bits |
|---|---|---|
| Immediate | 0 | Immediate Value |
| Offset | 1 | Initial Register Space Offset for an Immediate Value |
| Leaf | 2 | Indirect Space Offset for a Leaf |
| Directory | 3 | Indirect Space Offset for a Directory |

For an immediate entry, the entry value is the 24-bit value for that directory entry. Its meaning is dependent on the type of entry. For an offset entry, the entry value contains a 24-bit offset field. The offset value specifies a CSR address as a quadlet offset from the base address of the initial register space. For the leaf and directory entries, the entry value provides a 24-bit indirect offset value which specifies the address of the leaf or directory of the indirect space. The indirect offset value indirectly specifies the ROM offset address of the leaf or the directory. Thus, using the key type and key value, a specific entry in the configuration ROM 10 of a node on the serial bus can be identified.

The CSR Architecture provides for only 64 key values in directory and leaf entries within a ROM 10. Many of these 64 values have already been defined by various industry-wide specifications, such as the IEEE 1394 Serial Bus Standard, for particular computer interconnects. As a result, the available key space has been virtually exhausted.

SUMMARY OF THE INVENTION

The present invention provides for true "plug and play" capabilities within a computer system using extended key values within hierarchical tree data structures. In a preferred embodiment, the method is applied to control and status registers (CSRs) of configuration ROMs.

A computer system comprises a plurality of nodes interconnected by point-to-point links and forms a serial bus. At least one of the plurality of nodes includes an associated configuration memory storing configuration information. The configuration memory is arranged into a plurality of directories according to an hierarchical structure. At least one of directories has a key value which indicates a unique directory entry within the configuration memory, the unique directory entry comprising an extended key value.

In one embodiment, the extended key value allows for true "plug and play" operation of the computer system by specifying a device driver directory within the CSR ROMs.

In a second embodiment, the extended key value allows for true "plug and play" operation of the computer system by specifying a protocol directory within the CSR ROMs.

These and other features of the present invention will become clear with reference to the attached drawings and the detailed description provided herein.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for a plug and play serial bus interface is described. In a preferred embodiment, true plug and play operation of a computer system is provided using extended key values within control and status registers (CSRs) of configuration ROMs in the computer system. The bus architecture described herein, though described with reference to a preferred embodiment comprising components for a single computer, in general has a broader scope and could include test and measurement systems, positioning and robotic systems, and audio and video components, for example. The present invention may be applied to any arbitrarily assembled collection of nodes linked together as in a network of devices. It must also be noted that it is necessary to distinguish a node from a logical unit. Each node to reside on the bus will have associated with it at least one logical unit. In certain circumstances, a given node may be associated with multiple logical units. Usually however, there will be a one-to-one correspondence between logical units and nodes on the bus.

Figure 4:
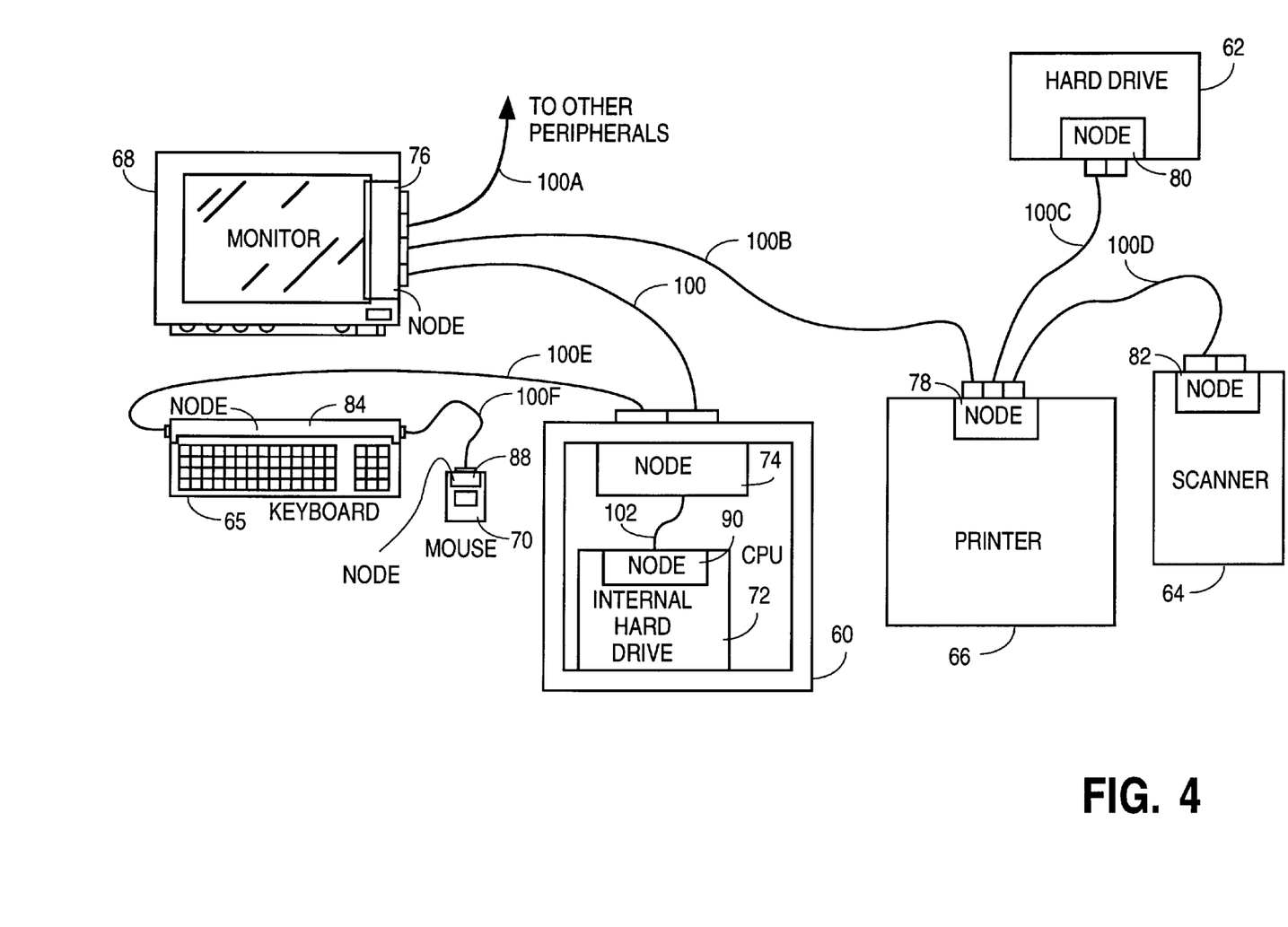
FIG. 4 shows a computer system having a serial bus made up of a number of nodes.

Procedures of the present invention to be described operate within the environment of a computer system 50 as shown in FIG. 4. Although described with reference to a computer system 50 generally constructed in accordance with the IEEE 1394 Serial Bus Standard, the present invention is applicable to any computer system that implements the CSR Architecture.

Computer system 50 of FIG. 4 comprises a central processing unit (CPU) 60, a monitor 68, a printer 66, a hard drive 62, a scanner 64, a keyboard 65, and a mouse 70. The CPU 60 includes an internal hard drive 72 and a memory (not shown). Each of the devices of the computer system is coupled to a node of the serial bus. In general, the device to which a node is coupled acts as the "local host" for that node. For example, the CPU 60 is the local host for the CPU node 74; the monitor 68 is the local host for the monitor node 76; the printer 66 is the local host for the printer node 78; the hard drive 62 is the local host for the hard drive node 80; the scanner 64 is the local host for the scanner node 82; the keyboard 65 is the local host for the keyboard node 84; the mouse 70 is the local host for the mouse node 88; and the internal hard drive 72 is the local host for the internal hard drive node 90. It is not necessary for every node to have a local host, nor is it necessary that the local host always be powered.

A point-to-point link such as cable 100 is used to connect two nodes to one another. The CPU node 74 is coupled to internal hard drive node 90 by an internal link 102, to monitor node 76 by cable 100, and to a keyboard node 84 by a cable 100. The keyboard node 84 is coupled to the mouse node 88 by cable 100f. The monitor node 76 is coupled to the nodes of other peripherals (not shown) by cable 100a and to the printer node 78 by cable 100b. The printer node 78 is coupled to the hard drive node 80 by cable 100c and to the scanner node 82 by cable 100d. Each of the cables 100–100f and the internal link 102 may be constructed in accordance with the IEEE 1394 Serial Bus Standard and includes a first differential signal pair for conducting a first signal, a second differential signal pair for conducting a second signal, and a pair of power lines.

Each of the nodes 74, 76, 78, 80, 82, 84, 86 and 90 may have identical construction, although some of the nodes, such as mouse node 88, can be simplified because of their specific functions. Thus, the nodes can be modified to meet the needs of the particular local host. For example, each node has one or more ports, the number of which is dependent upon its needs. For example, CPU node 74, as illustrated, has three ports, while the mouse node 44 has only one port.

Each of the nodes 74, 76, 78, 80, 82, 84, 86 and 90 provides an address space which can be directly mapped to one or more units. A unit is a logical entity, such as a disk controller, which corresponds to unique input/output (I/O) driver software. A unit may be defined by a unit architecture which defines the format and function of the unit's software visible registers. Within a unit there may be multiple subunits, which can be accessed through independent control registers or uniquely addressed DMA-command sequences.

The serial bus of computer system 50 may be adapted for use in different types of electronic systems. For example, the serial bus may be used to interconnect the components of an audio/visual electronic system wherein the local hosts may include a video camera, a video recorder, a video monitor, and an audio amplifier.

As discussed above, each node 74, 76, 78, 80, 82, 84, 86 and 90 of the serial bus implements a configuration ROM. Each configuration ROM is divided into a root directory, various root dependent directories, root leafs, unit directories, unit dependent directories, and unit leafs. Thus, the directories are arranged in a hierarchical fashion.

As further described above, the CSR Architecture provides for 64 key values in directory and leaf entries within configuration ROMs. Many of these 64 values have already been assigned. For example, the IEEE 1394 Serial Bus Standard assigns key values for Module_Vendor_Id entries, Node_Capabilities entries, Node_Unique_Id entries, Unit_Power_Requirements entries, and other entries. If the directory and leaf entries are limited to 64 values, support for "plug and play" ROM information and for future ROM entries will soon exhaust the available key space.

To overcome this problem, the present invention provides for the use of extended key values within the configuration ROM hierarchical structure. For an embodiment where the configuration ROMs reside in nodes of a computer interconnect conforming to the IEEE 1394 Serial Bus Standard, two new basic key values are used to indicate (i) directories or leafs with extended key values, and (ii) the extended key value within a directory.

Figure 5A:
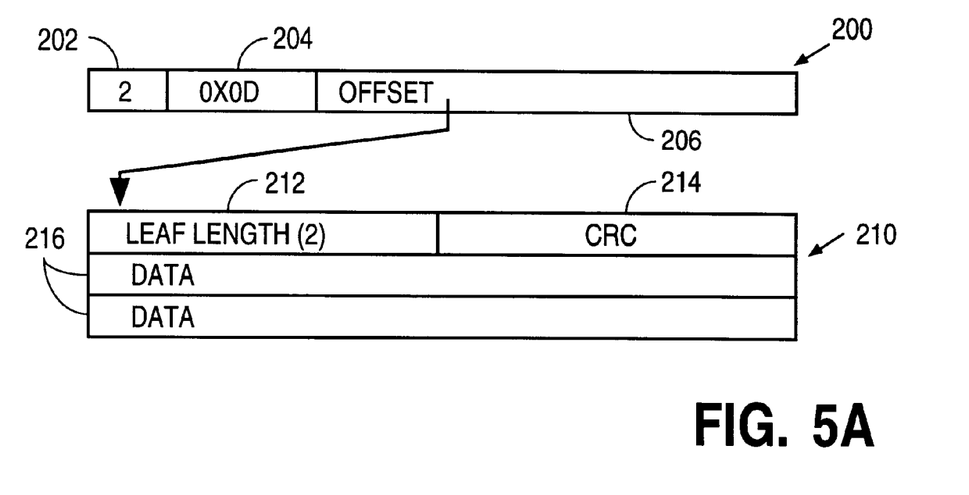
FIG. 5a illustrates an ordinary key value for a leaf.
Figure 5B:
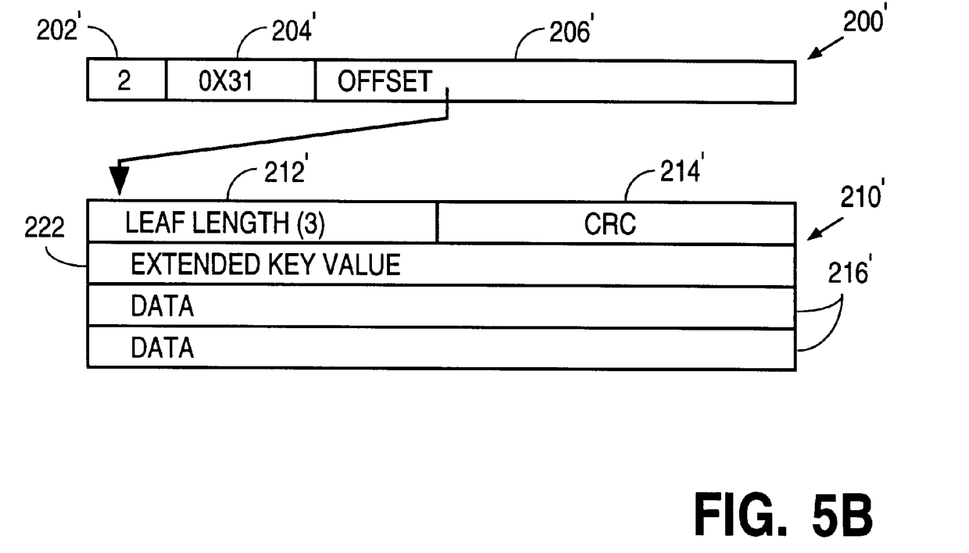
FIG. 5b illustrates an extended key value for a leaf.

FIGS. 5a and 5b illustrate the distinction between the use of key values according to the CSR Architecture and the use of extended key values according to the present invention. FIG. 5a shows the format of a CSR ROM offset entry 200 for a leaf according to the CSR Architecture. The offset entry 200 includes a key type field 202, a key value field 204 and an offset field 206. The offset field 206 contains an indirect offset parameter which specifies the ROM-offset address of a corresponding leaf entry 210. The leaf entry 210 comprises a leaf length field 212, a CRC field 214 and several data fields 216. The leaf length parameter stored in the leaf length field 212 specifies the number of following quadlet entries in the leaf; the total number of bytes in the leaf is 4+(4×leaf_length). The CRC value covers all of the following quadlets in the leaf.

FIG. 5b shows the use of an extended key value according to the present invention. As before, an offset entry 200' specifies a leaf entry 210'. The offset entry 200' includes a key type field 202' and an offset field 206'. This time, however, a new key value parameter 0×31 in key value field 204' indicates that the leaf entry 210' contains an extended key value. The new key value parameter 0×31 in the offset entry 200' is an example only. Any suitable key value which has not otherwise been assigned could be used.

The leaf entry 210' of FIG. 5b contains an extended key value field 222. The extended key value field 222 is 32-bits wide, providing for over four billion possibilities. The data fields 216' for the leaf entry 210' follow the extended key value field 222 in the leaf_entry 210'. Notice that when an extended key value is stored within a leaf, the leaf-length parameter still specifies the total length of the leaf data, less the first quadlet. This conforms to the CSR Architecture. In this way, the leaf 210' may be correctly accessed (if not interpreted) by software which complies to the CSR Architecture. Software which is aware of extended key values will recognize that the leaf data actually starts after the extended key value field 222.

Figure 6A:
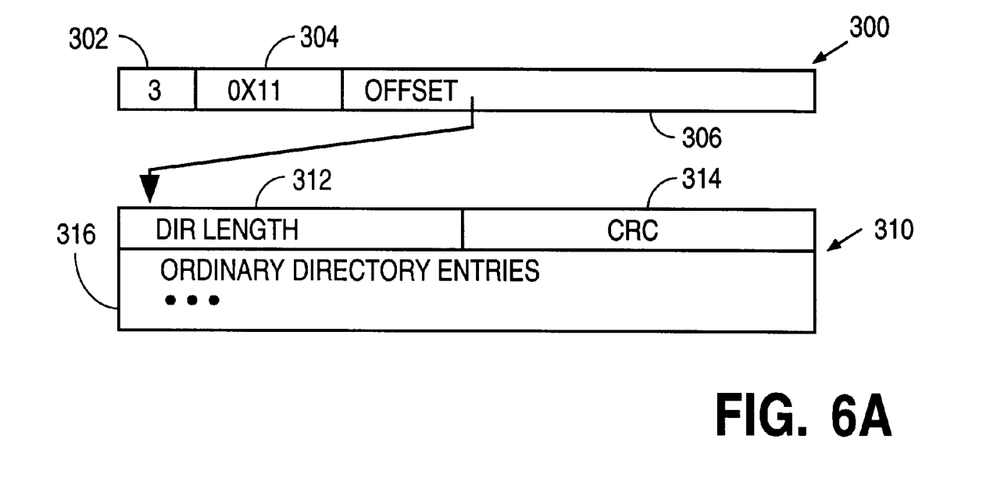
FIG. 6a illustrates an ordinary key value for a directory.
Figure 6B:
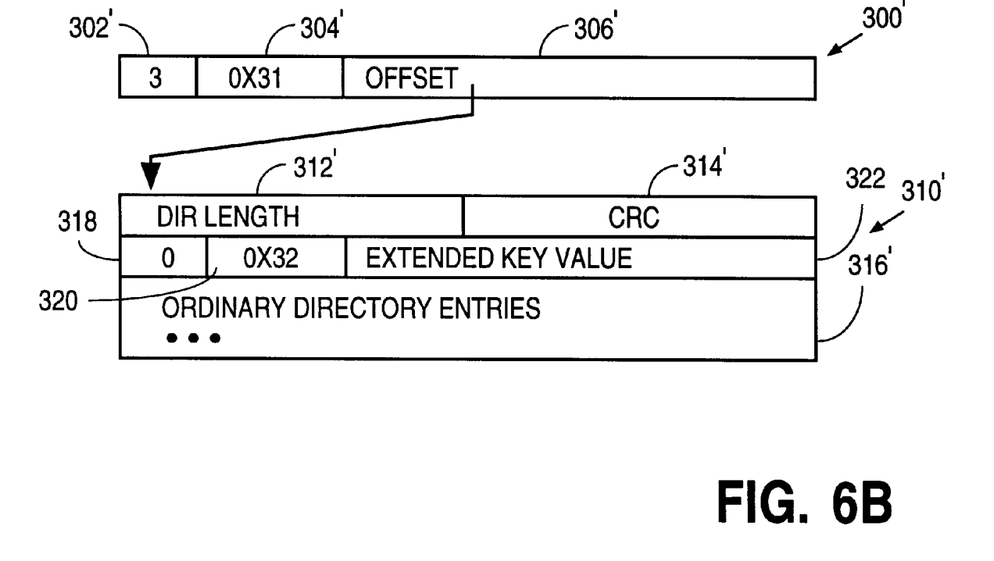
FIG. 6b illustrates an extended key value for a directory.

FIGS. 6a and 6b similarly illustrate the distinction between the use of key values according to the CSR Architecture and the use of extended key values according to the present invention. FIG. 6a shows the format of a CSR ROM offset entry 300 for a directory according to the CSR Architecture. The offset entry 300 includes a key type field 302, a key value field 304 and an offset field 306. The offset field 306 contains an indirect offset parameter which specifies the ROM-offset address of a corresponding directory entry 310. The directory entry 310 comprises a directory length field 312, a CRC field 314 and several directory entries 216. The directory length parameter stored in the directory length field 312 specifies the number of following quadlet entries in the directory; the total number of bytes in the leaf is 4+(4×directory_length). The CRC value covers all of the following quadlets in the leaf.

FIG. 6b shows the use of an extended key value according to the present invention. As before, an offset entry 300' specifies a directory entry 310'. The offset entry 300' includes a key type field 302' and an offset field 306'. This time, however, a new key value parameter 0×31 in key value field 304' indicates that the directory entry 310' contains an extended key value. Again, the new key value parameter 0×31 in the offset entry 300' is an example only. Any suitable key value which has not otherwise been assigned could be used.

The directory 310' of FIG. 6b contains a new immediate entry field (indicated by a key type of 0). The new immediate entry field includes a key type field 318; a key value field 320 which stores a new key value parameter 0×32, indicating that the value field which follows is an extended key value; and an extended key value field 322. The new key value parameter 0×32 is an example only. Any suitable key value which has not otherwise been assigned could be used. The directory entry 310' further includes ordinary directory entries 316'. The extended key value field 322 is 24-bits wide, providing for over sixteen million possibilities. If 24 bits proves to be too few for directory extended keys, a 32-bit extended key could be implemented by using key type 2 (leaf offset) with key value 0×32, to specify the location of a leaf with a full 32-bit extended key.

One example of the use of extended key values concerns directory structures for device drivers. For true "plug and play" operation, each device (or unit) of computer system 50 must be able to provide its own device driver so that an operating system can load and use that driver without the need for manual driver installation. Drivers for multiple operating systems may be provided by a device. Information about these drivers can be stored in a directory in a CSR ROM. The actual drivers may be stored in the CSR ROM, from which they can be loaded directly, or the drivers could be made available over the internet, referenced by a URL, or by some other loading mechanism. To accommodate these multiple drivers, a device driver directory may be established within each unit directory in a CSR ROM so that nodes with multiple units can make multiple drivers available.

Drivers are identified by a host class which describes the operating system and platform that the driver supports. Examples of host classes could be the Macintosh Operating System for the PowerPC processor, available from Apple Computer, Inc., of Cupertino, Calif.; and the Windows NT operating system for the Power PC processor and the Windows NT operating system for x86 processors, both available from Microsoft Corp., of Redmond, Wash. For each driver, information is offered for use by one or more loading mechanisms. A driver image present in the CSR ROM as a leaf can be loaded if the leaf offset is specified. A driver image present on the media of a mass storage device (e.g., hard drive 62) might be loadable using logical address and length values. A driver image present on the internet might be loadable using a URL.

Figure 7:
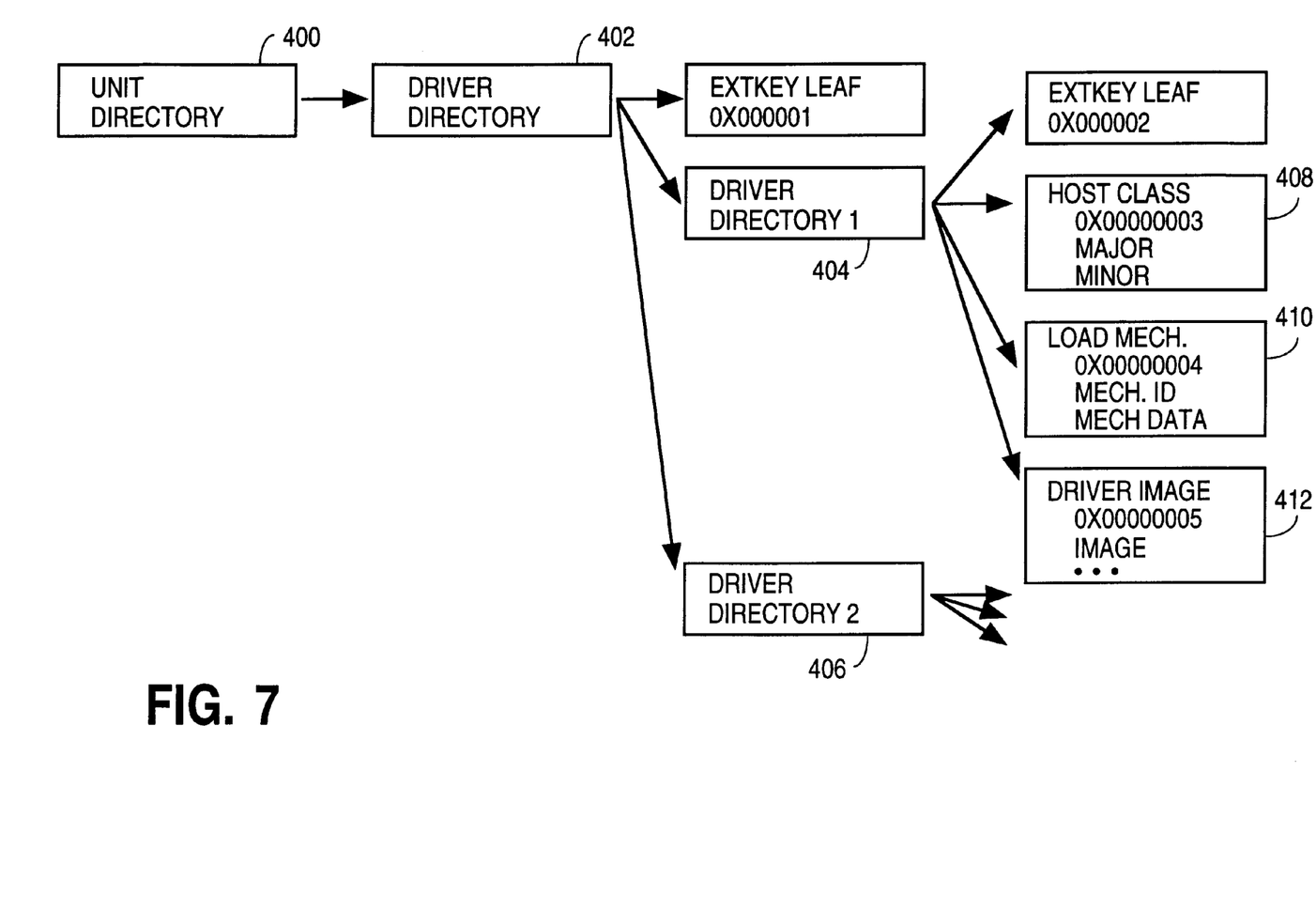
FIG. 7 illustrates a driver directory structure using extended key values according to one embodiment.

To accommodate these device driver directories, extended keys, as described above, are used within the CSR ROM. As shown in FIG. 7, each unit directory 400 contains a device driver directory 402. Each device driver directory 402, in turn, contains a set of subdirectories (keyed by extended keys), each of which describes a driver for one host class. Note, although the use of extended keys is preferred, those skilled in the art will appreciate that device driver directories and their associated subdirectories could be implemented using the standard 64-keys, provided the keys so used are not otherwise assigned.

Among the subdirectories in the driver directory 402 are a number of host class driver subdirectories 404,406. Each host class driver subdirectory contains several leafs. One leaf 408 contains the host class of the driver. A second leaf 410 is present for each loading mechanism which can be used to load the driver (often only one will be required). If the driver image is stored in the CSR ROM, a third leaf 412 containing the driver may also be present in the subdirectory 404. Alternatively, if the loading mechanism data specifies an absolute address for the driver image, the driver could be stored anywhere in the CSR ROM.

For the example shown in FIG. 7, the following extended key values are used:

| | | |
|---|---|---|
| 0x000001 | DriverDirKey | Indicates the Device Driver Directory for a node. |
| 0x000002 | DriverSubDirKey | Indicates a driver subdirectory within the Device Driver Directory. |
| 0x0000003 | DriverHostClassKey | Indicates a host class leaf for a driver subdirectory. |
| 0x0000004 | DriverLoadKey | Indicates a loading mechanism leaf for a driver subdirectory. |
| 0x0000005 | DriverImageKey | Indicates a device driver image leaf. |

Figure 8:
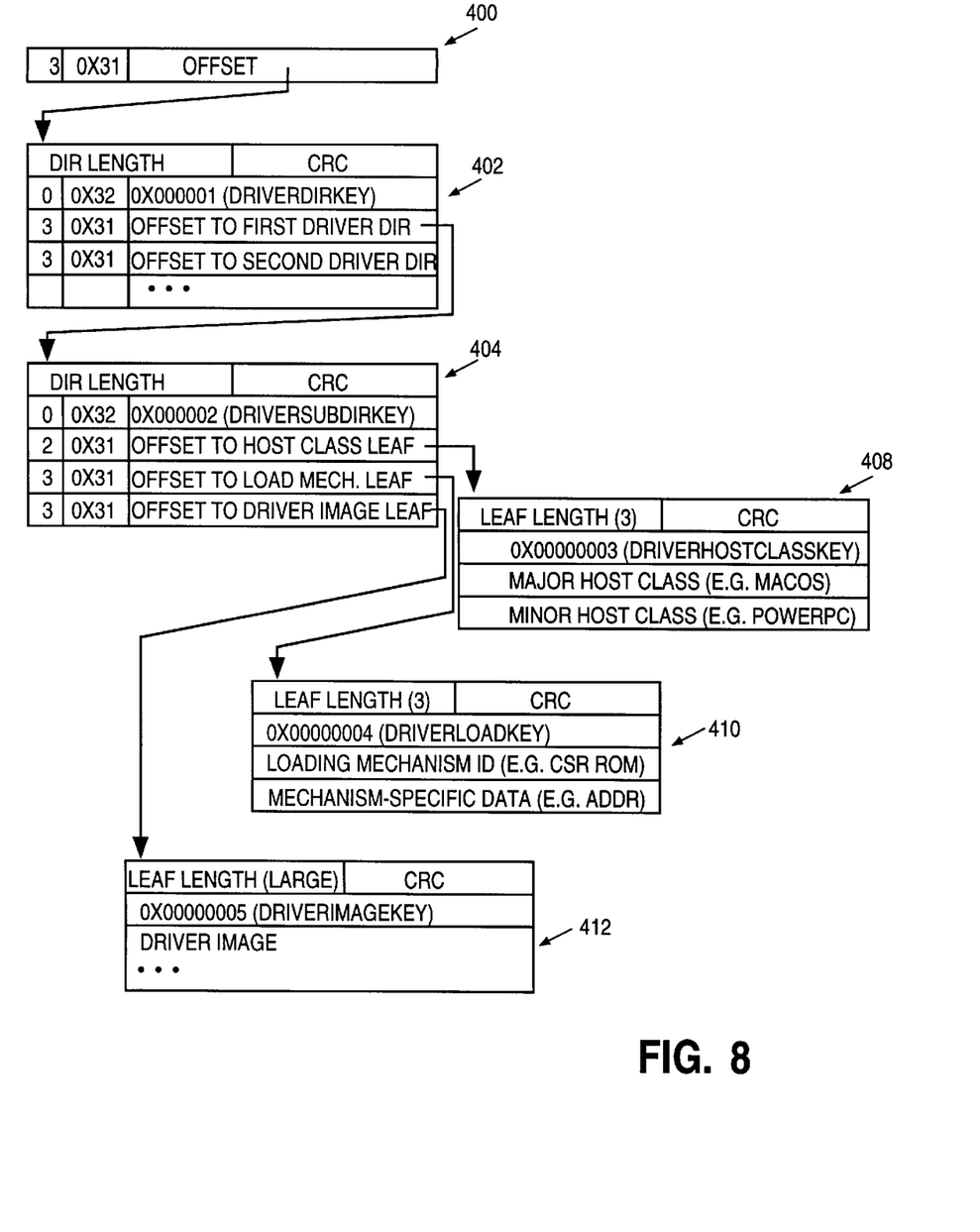
FIG. 8 illustrates exemplary ROM data for the driver directory structure shown in FIG. 7.

FIG. 8 shows the exemplary ROM data for the device driver directory shown in FIG. 7. As for the examples shown in FIGS. 5 and 6, the key value 0x31 is used to indicate a directory or leaf with an extended key. The key value 0x32 is used to indicate an extended key value within a directory. Again, these key values are arbitrary and those skilled in the art will appreciate that any otherwise unassigned key values could be used.

Figure 8A:
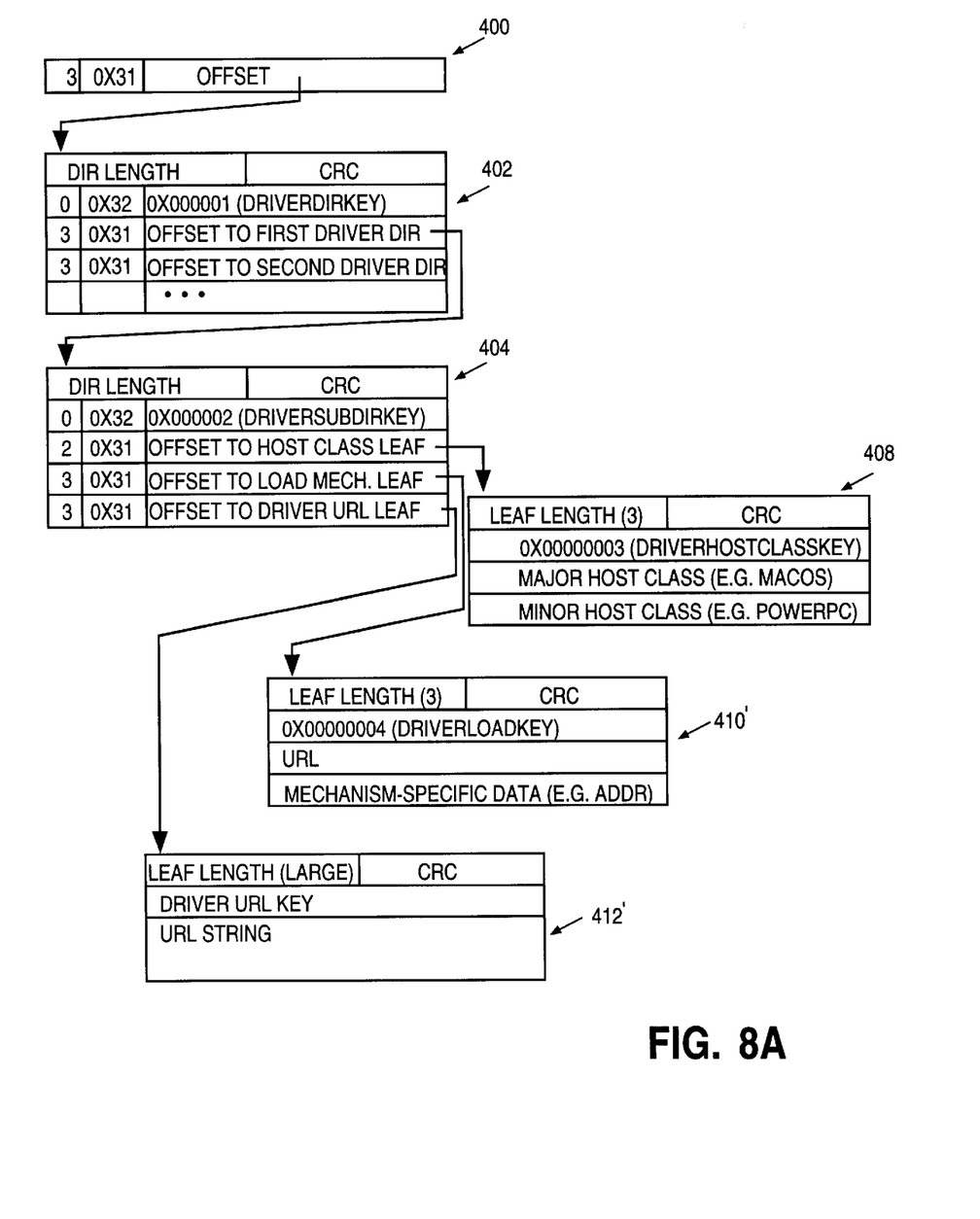
FIG. 8a illustrates exemplary ROM data for a driver directory where the driver image is present on the internet at a location specified by a URL.

FIG. 8a shows a similar example of ROM data for a device driver directory where the driver image is present on the internet. The driver loading mechanism, leaf 410' now specifies a URL where the driver image can be found.

A second example of the use of extended keys concerns directory structures for protocols. To maximize the potential for "plug and play" operation, device manufacturers may support multiple protocols in a single unit so that a device can operate in many different environments. For example, a flatbed scanner might support both a SCSI-like protocol, for compatibility with SCSI-based scanners, and also a video or image protocol such as AV/C, for compatibility with image-based hardware. Other devices, especially host computers, can scan a unit directory to find protocol directories to decide (or to help a user decide) which protocol to use. In addition to identifying the available protocols, the protocol directories may contain additional information, such as the base address of a protocol-specific register file.

For single protocol units, the unit spec_ID could be used by a host computer to determine the correct protocol, provided the spec_ID was known when the host computer software was written. A new unit in a new device, with an unknown spec_ID, which supports a new protocol, might also be capable of supporting an old protocol, but spec_ID matching would be insufficient in this case. Similarly, spec_ID matching is insufficient to determine the best protocol to use for a multiprotocol unit, even if all protocols are supported by all participants. Finally, spec_ID matching cannot distinguish between units from the same manufacturer which support different, incompatible protocols. The use of protocol directories eliminates all of these problems in a generic, flexible way.

It should be noted that a manufacturer can implement protocol directories in a device, but can, at the same time, disregard these directories when implementing single-vendor solutions. For example, identical digital camcorders could recognize each other by spec_ID and communicate using their preferred protocol without reading one another's protocol directories.

Unlike the above example for device driver directories which contain a subdirectory for each host class, a preferred embodiment has each protocol directory existing within the unit directory that it belongs to. Unlike device drivers, which may be numerous, most units will only export one or two protocols, hence, an additional level of directory hierarchy is unnecessary. Of course, this is only a currently preferred implementation and, if multiple protocols are to be supported, the additional directory level can be added.

Figure 9:
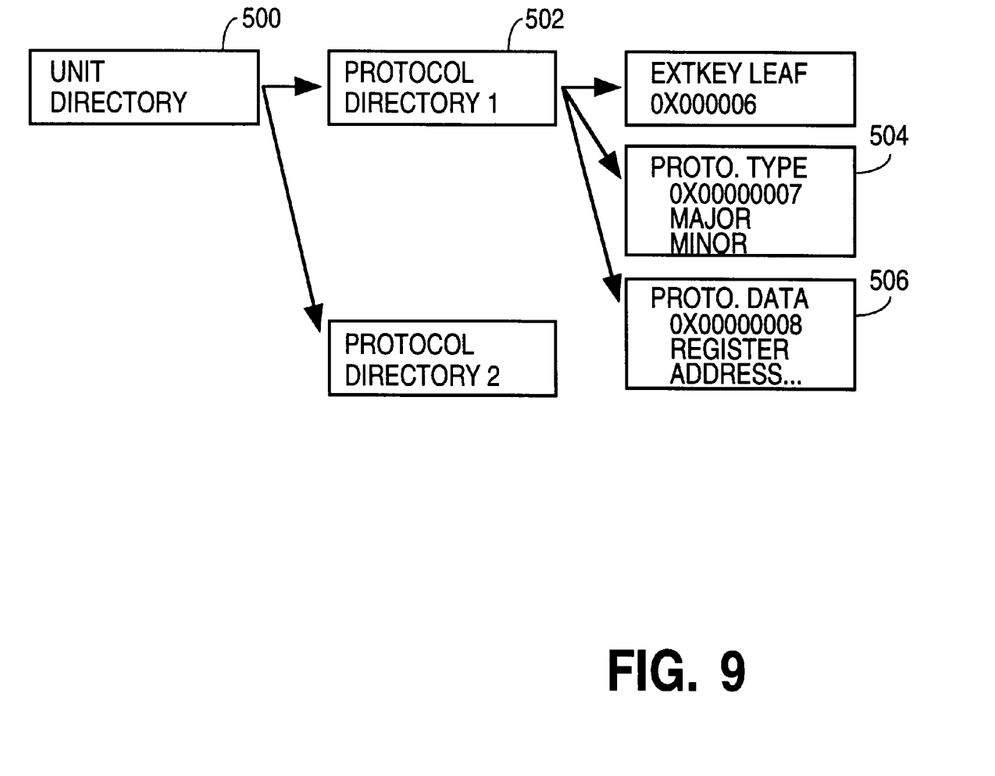
FIG. 9 illustrates a protocol directory structure using extended key values according to one embodiment.

As shown in FIG. 9, within a protocol directory the identity of the protocol supported can be given by two values, a major protocol type and a minor protocol type. Major protocol types could include FCP, SBP, PAP, and others. Minor protocol types, e.g., for FCP, could include AV/C, CAL, or others. These protocols would be identified numerically, according to a standardized registry. Thus, as shown in FIG. 9, a unit directory 500 contains one or more protocol directories 502. Each protocol directory contains a protocol type leaf (identified with an extended key value) 504 with the appropriate major and minor protocol type information. In addition, each protocol directory 502 contains a protocol data leaf (also identified with an extended key value) 506 for protocol-specific information. For the example shown in FIG. 9, the following extended keys are used:

| | | |
|---|---|---|
| 0x000006 | ProtoDirKey | Indicates a protocol directory for a node. |
| 0x00000007 | ProtoTypeKey | Indicates a protocol type leaf in a protocol directory. |
| 0x00000008 | ProtoDataKey | Indicates a protocol-specific information leaf in a protocol directory. |

Figure 10:
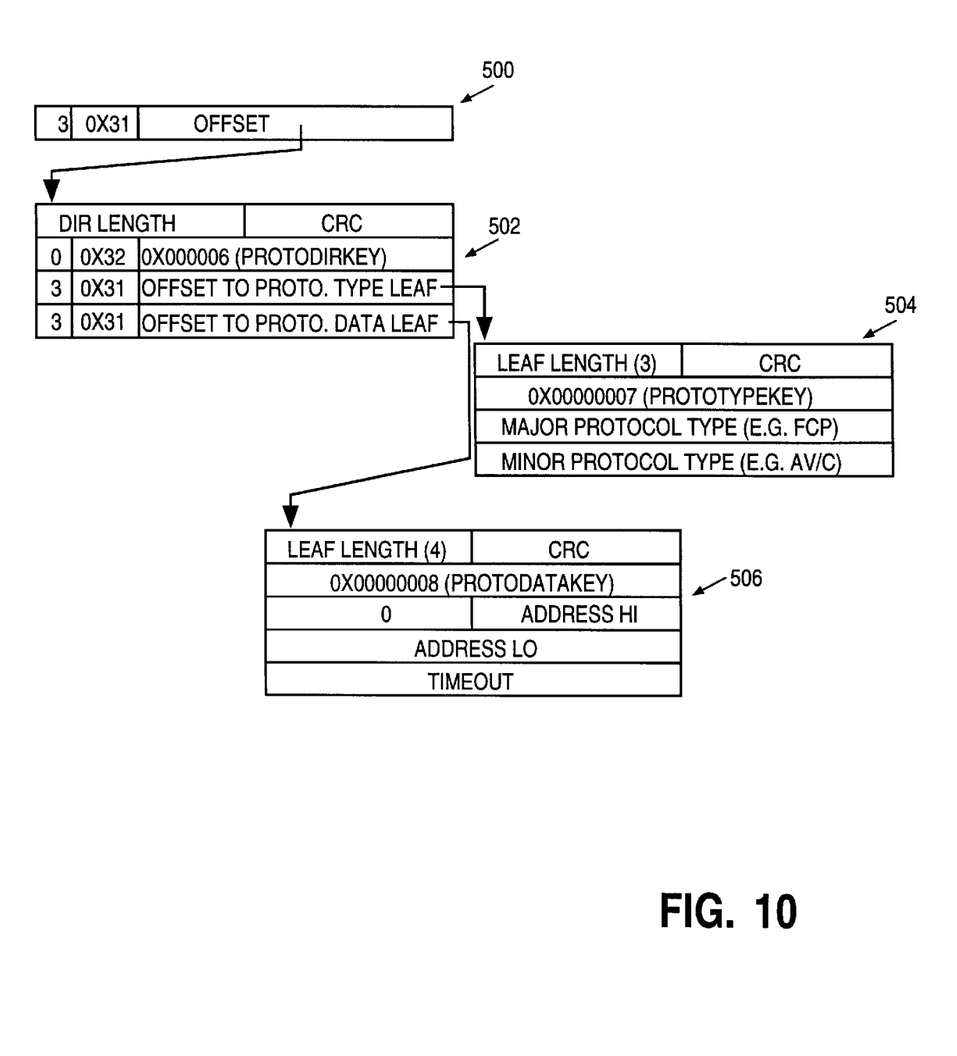
FIG. 10 illustrates exemplary ROM data for the protocol directory structure shown in FIG. 9.

FIG. 10 shows the exemplary ROM data for an FCP-specific protocol directory. As for the above examples, the key value 0x31 is used to indicate a directory or leaf with an extended key. The key value 0x32 is used to indicate an extended key value within a directory. Again, these key values are arbitrary and those skilled in the art will appreciate that any otherwise unassigned key values could be used.

Thus, a method and apparatus for "plug and play" serial bus interface has been described. While the present invention has been described with reference to particular embodiments, one skilled in the art will recognize other embodiments which come within the scope of this invention. It should, therefore, be appreciated that the present invention should not be construed as limited by such embodiments, but rather construed by the below claims.

I claim:

1. An apparatus comprising a bus including a plurality of nodes interconnected by a plurality of communication links, a first node for the plurality of nodes, the first node having an associated configuration memory for storing configuration information, the configuration memory being arranged into a plurality of directories according to an hierarchical structure, at least one of directories being a device driver directory the device driver directory specifying a Uniform Resource Locator (URL) in which a device driver is found.

2. An apparatus comprising:
   a plurality of nodes interconnected by a plurality of communication links;
   a first node of the plurality of nodes having an associated configuration memory to store configuration information; and
   said configuration memory arranged in a plurality of directories, at least one of the directories having a key value, the key value indicating a unique directory entry within the configuration memory, the unique directory entry comprising an extended key value.

3. The apparatus of claim 2, wherein the apparatus comprises digital and analog systems.

4. The apparatus of claim 3, wherein at least one of the directories having at least one leaf, the extended key value stored within the leaf.

5. The apparatus of claim 3, wherein the extended key value specifies a device driver directory.

6. The apparatus of claim 3, wherein the extended key value specifies a protocol directory.

7. A method of providing plug and play capabilities in a system comprising:
   providing a node in a plurality of devices in the system;
   providing a first node in the plurality of nodes, an associated configuration memory to store configuration information; and
   arranging the configuration memory in a plurality of directories, at least one of the directories having a key value, the key value indicating a unique directory entry within the configuration memory, the unique directory ent comprising an extended key value.

8. The method of claim 7, further comprising:
   providing a leaf in the directory; and
   storing the extended value within the leaf.

9. The method of claim 7, wherein the extended key value specifies a device driver directory.

10. The method of claim 7, wherein the extended key value specifies a protocol directory.

11. An apparatus comprising:
   a first node adapted to be interconnected by a communication link to a second node;
   said first node having an associated configuration memory to store configuration information; and
   said configuration memory arranged in a plurality of directories, at least one of the directories having a key value, the key value indicating a unique directory within the configuration memory, the directory entry comprising an extended key value.

12. The apparatus of claim 11, wherein the apparatus is at least one of a digital or an analog device.

13. The apparatus of claim 12, wherein at least one of the directories having at least one leaf, the extended key value stored within the leaf.

14. The apparatus of claim 12, wherein the extended key value specifies a device driver directory.

15. The apparatus of claim 12, wherein the extended key value specifies a protocol directory.

* * * * *